United States Patent [19]

Cody et al.

[11] 4,369,616
[45] Jan. 25, 1983

[54] CENTRIFUGAL CLUTCH AND BRAKE FOR LAWNMOWER

[76] Inventors: John M. Cody, 1954 W. Sharon St.; William L. Weaks, 650 S. Virginia St., both of Quincy, Fla. 32351

[21] Appl. No.: 200,825

[22] Filed: Oct. 27, 1980

[51] Int. Cl.³ .............................................. A01D 75/00
[52] U.S. Cl. ...................... 56/11.3; 192/18 R; 192/8 R
[58] Field of Search ............ 192/18 R, 12 R, 8 R, 192/7, 103 B, 105 BA, 105 CD; 56/11.3

[56] References Cited

U.S. PATENT DOCUMENTS

| | | | |
|---|---|---|---|
| 3,026,665 | 3/1962 | Hoff | 56/11.3 |
| 3,058,561 | 10/1962 | Spalding | 192/105 CE |
| 3,245,505 | 4/1966 | Staengle et al. | 192/12 R |
| 3,253,391 | 5/1966 | Meldahl | 56/11.3 |
| 3,731,472 | 5/1973 | Kamlukin | 56/11.3 |
| 3,871,159 | 3/1975 | Shriver | 56/11.3 |
| 3,994,376 | 11/1976 | Fulghnm | 192/8 R |
| 4,035,994 | 7/1977 | Hoff | 56/11.3 |
| 4,205,737 | 5/1980 | Harkness et al. | 192/17 R |

FOREIGN PATENT DOCUMENTS 623657  7/1961  Canada ......................... 192/18 R

*Primary Examiner*—George H. Krizmanich
*Attorney, Agent, or Firm*—Dowell & Dowell

[57] ABSTRACT

An apparatus which automatically prevents the rotation of a rotary blade or the like when a power plant is operating at idling speed and which drivingly engages the rotary blade when the power plant is driven at a predetermined speed which is greater than idling speed. The apparatus includes a housing having a generally frusto-conical portion and a brake shoe which engages a fixed brake band under spring pressure when the power plant is at idling speed and a plurality of weights which move outwardly by centrifugal action into engagement with the housing to move the housing away from the brake shoe and provide a drive connection to a rotary blade when the speed of rotation of the power plant is increased a predetermined amount.

7 Claims, 5 Drawing Figures

U.S. Patent  Jan. 25, 1983  Sheet 1 of 2  4,369,616
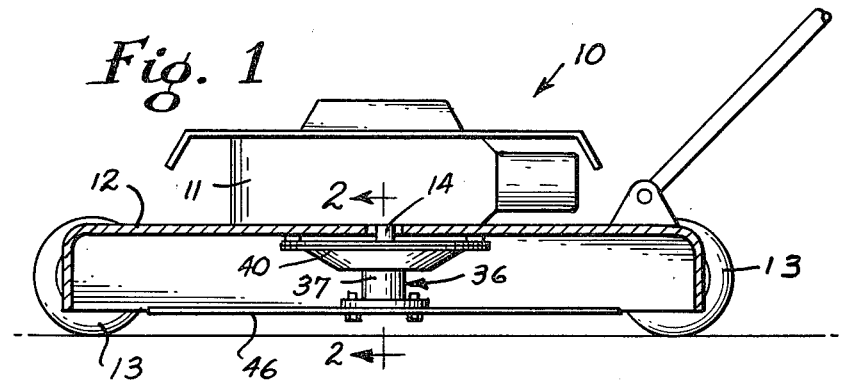
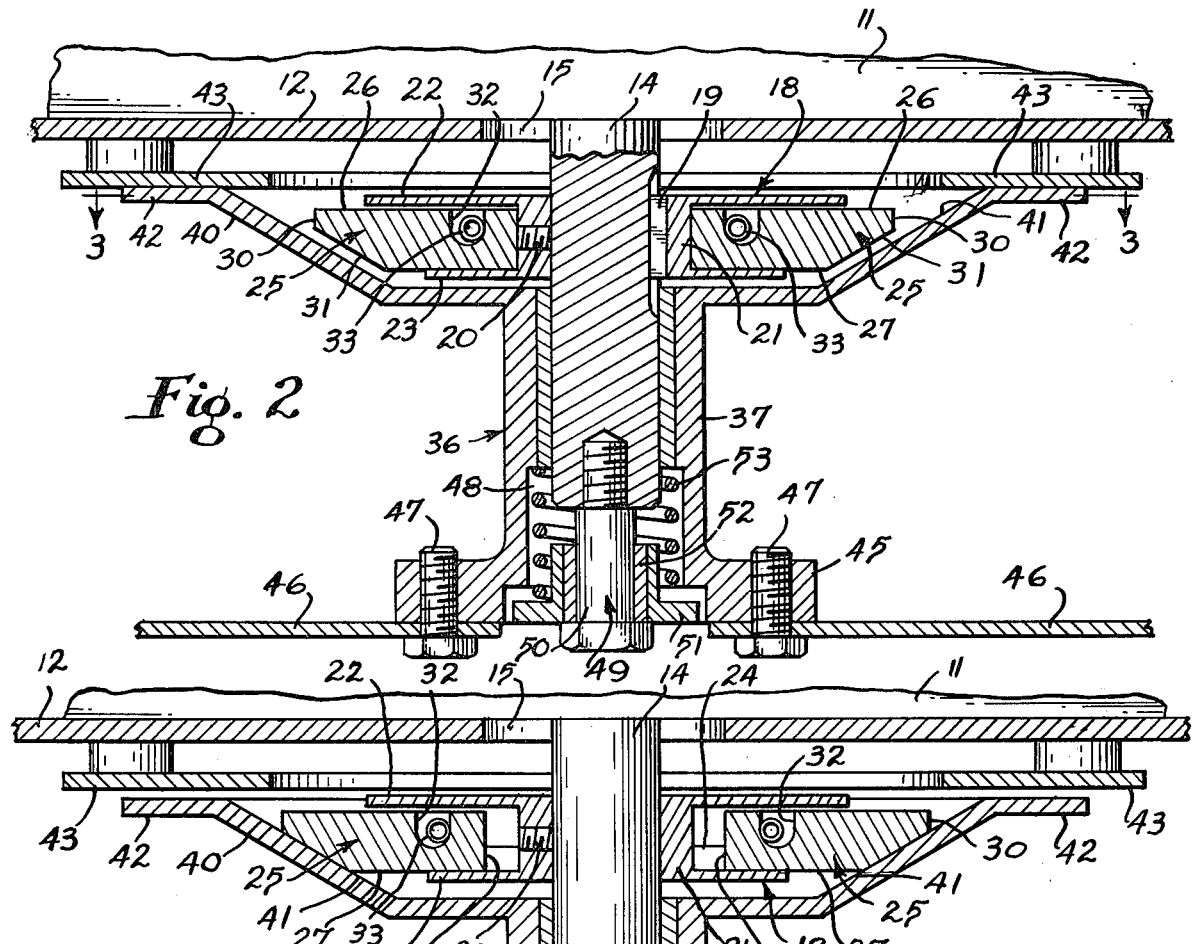
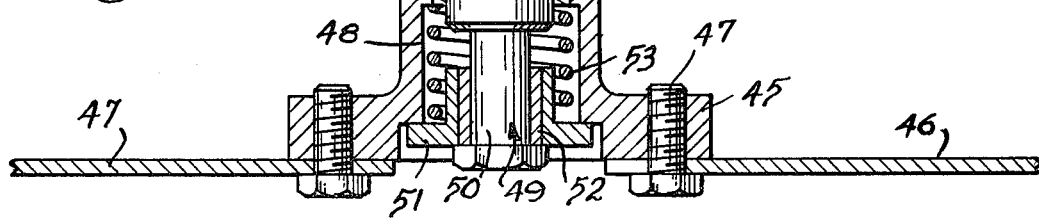

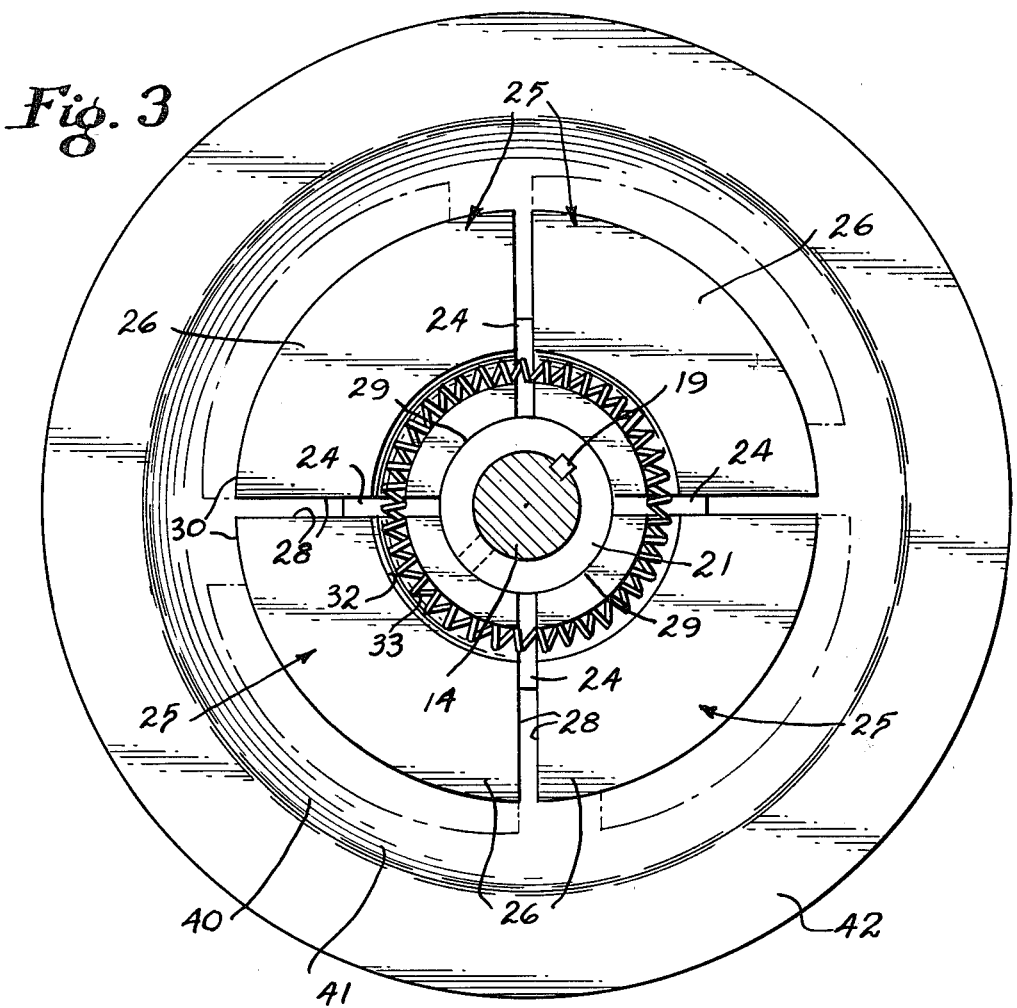
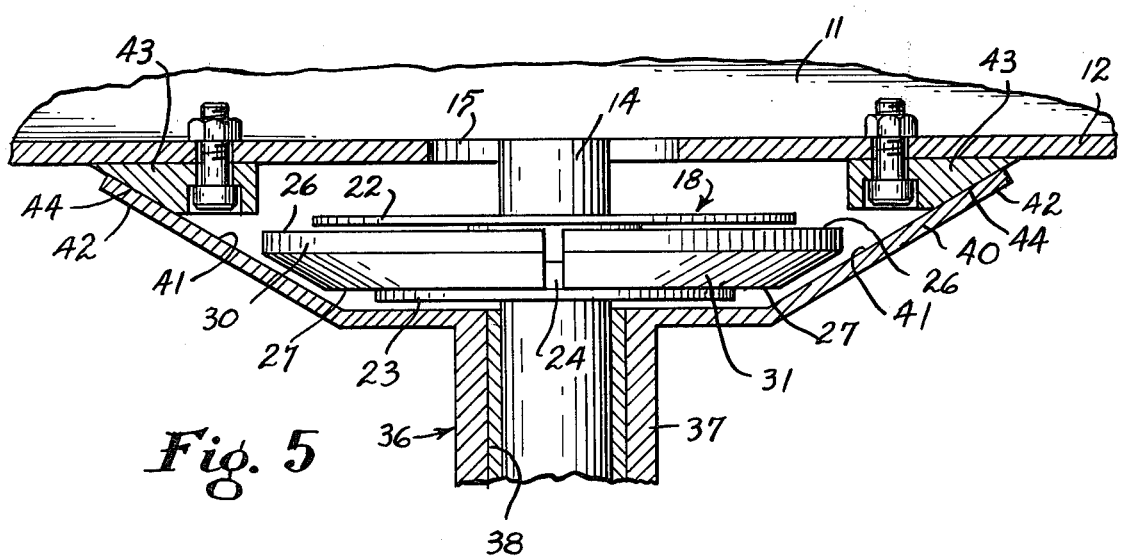

CENTRIFUGAL CLUTCH AND BRAKE FOR LAWNMOWER

TECHNICAL FIELD

This invention relates generally to apparatus for transmitting power from a power plant to a driven element and relates specifically to an apparatus which automatically provides a driving connection between a power plant and a driven element when the power plant is driven at a predetermined speed and which automatically applies a braking action to the driven element when the power plant is operated at less than the predetermined speed.

BACKGROUND ART

In the past, many machines such as power operated rotary blade lawnmowers, edgers, saws and the like have been provided in which the rotating element or blade has been directly connected to the output shaft of the power plant so that the blade has been driven as long as the power plant was operated. This has presented a constant danger to the operator who sometimes has inadvertently inserted his hand or foot into or under the blade housing where it was struck by the blade and resulted in severe bodily damage to the operator.

Some efforts have been made to provide a centrifugal clutch arrangement intermediate the power plant and the driven element or blade so that the blade is driven only when the power plant output shaft exceeds a predetermined number of revolutions per minute and the blade is freely rotatable relative to the output shaft when the number of revolutions falls below the predetermined number. However, when the power plant has been driven at operating speed and then is reduced to idling speed, the rotating blade continues to free wheel as it slows until it is stopped by friction or the blade strikes an object. An example of this type of arrangement is shown in U.S. Pat. No. 3,058,561 to Spalding.

Some additional efforts have been made to provide a friction clutch which is applied by centrifugal force and in which the rotating element or blade of the lawnmower has been provided with a brake which stops the rotation of the blade either manually or automatically. In such cases, as in U.S. Pat. Nos. 3,026,665 and 4,035,994 to Hoff, and U.S. Pat. No. 3,253,391 to Meldahl, for example, the brake mechanism is attached to an engine governor and such governor is controlled by a manually operated control rod so that the operator can control the speed of the power plant by operating the control rod. Since the brake is attached to the governor when the control rod is operated to reduce the number of revolutions of the output shaft of the power plant, the brake also is controlled by the control rod.

In other structures, such as U.S. Pat. No. 3,871,159 to Shriver; U.S. Pat. No. 4,058,957 to Roseberry; U.S. Pat. No. 4,117,651 to Martin; U.S. Pat. No. 4,122,652 to Holtermann; and U.S. Pat. No. 4,205,737 to Harkness et al, the rotating element is connected to the power plant by a centrifugal clutch and a brake band is connected to a deadman control lever so that the brake is applied as soon as the deadman lever is released.

In still other prior art structures, such as U.S. Pat. No. 3,731,472 to Kamlukin and U.S. Pat. No. 3,994,376 to Fulghum, the rotating element or blade is mounted on a threaded portion of a drive shaft so that when the power plant is operated at a predetermined number of revolutions per minute, the threaded connection causes the blade to be lowered to an operating position and when the driving torque which is applied to the shaft is interrupted, the rotating blade provides a torque which moves the blade upwardly about the threads so that the blade housing engages a braking surface.

DISCLOSURE OF THE INVENTION

The present invention is embodied in a centrifugal clutch and brake located between a power plant and a driven element such as a rotary blade of a lawnmower or the like and such apparatus includes a housing having a frusto-conical portion with the driven element or blade being mounted on such housing. Normally, a brake spring urges the frusto-conical portion of the housing upwardly into engagement with a brake shoe or other braking surface which interrupts rotation of the blade. A centrifugal clutch mechanism is mounted on the output shaft of the power plant and such centrifugal clutch includes a plurality of weights disposed about the output shaft and connected together by a resilient member such as a return spring. When the power plant is operating at a speed less than a predetermined number of revolutions per minute, the centrifugal force applied to the weights is not sufficient to cause the weights to overcome the tension of the spring and engage the frusto-conical portion of the housing on which the blade is mounted, and therefore the housing remains in engagement with the brake so that the cutting blade is inoperative.

When the speed of rotation of the output shaft is increased, the centrifugal force acting on the weights overcomes the tension of the spring and causes such weights to be extended into engagement with the frusto-conical portion of the housing. When the weights engage the housing, the housing initially is moved downwardly against the tension of the brake spring and away from the brake. As soon as the housing is moved away from the brake, the frictional engagement between the weights and the frusto-conical portion of the housing causes the housing to be rotated substantially at the speed of rotation of the output shaft. As soon as the speed of the output shaft is reduced to a predetermined number of revolutions per minute, the tension on the weight return spring overcomes the centrifugal force being applied to the weights and causes the weights to be retracted, at which time the brake spring urges the housing into engagement with the brake and substantially immediately interrupts rotation of the blade.

BRIEF DESCRIPTION OF THE DRAWINGS

FIG. 1 is a side elevational view illustrating one application of the invention.

FIG. 2 is an enlarged vertical sectional view taken on the line 2—2 of FIG. 1.

FIG. 3 is a sectional view taken on the line 3—3 of FIG. 2.

FIG. 4 is a vertical sectional view similar to FIG. 2 and illustrating the rotating blade in driving condition.

FIG. 5 is a fragmentary vertical sectional view similar to FIG. 2 and illustrating another embodiment.

BEST MODE FOR CARRYING OUT THE INVENTION

With continued reference to the drawings, a relatively small machine 10 such as a lawnmower, chopper, edger, saw or the like is provided with a power plant 11 which normally is mounted on a support structure such as a deck 12 in any well known manner such as screws or the like. If desired, the deck may be mounted on ground engaging wheels 13 for portability or the deck may be mounted in a fixed position. It is noted that the power plant 11 may be an internal combustion engine having a throttle or governor (not shown) for controlling the fuel consumption and speed of rotation or such power plant may be a variable speed electric motor which is controlled by a rheostat or the like. As a specific example, FIG. 1 of the drawings discloses the apparatus in use with a lawn motor of the rotary blade type which is driven by an internal combustion engine.

The power plant 11 has an output drive shaft 14 which extends downwardly through an opening 15 in the deck 12. Below the deck, a generally circular retainer 18 is fixed to the shaft 14 in any desired manner such as a key 19 (FIGS. 2 and 3) and a set screw 20 (FIGS. 2 and 4) so that the retainer is locked to the drive shaft in both vertical and horizontal directions. The retainer 18 includes a hub 21 having an outwardly extending generally circular flange 22 at one end and an outwardly extending generally circular flange 23 at the other end. The flanges 22 and 23 are in spaced generally parallel relationship with each other and define a substantially circular horizontally disposed cavity. The flange 23 is provided with a plurality of upstanding ribs or guides 24 and such ribs are illustrated as being radially disposed relative to such flange.

A plurality of weights 25 are positioned between the ribs 24 and such weights have generally flat upper and lower surfaces 26 and 27 respectively, a pair of side walls 28 which are disposed at an angle to each other, and inner and outer arcuate walls 29 and 30. The inner wall 29 is generally complementary with the hub 21 while the outer wall 30 is approximately concentric with the inner wall. A tapered frustro-conical contact surface 31 extends upwardly and outwardly from the lower surface 27 of each weight to the outer wall 30. Preferably, the contact surfaces 31 are disposed at an angle of approximately 15° to 30° to a horizontal plane. Each of the weights 25 has an arcuate recess 32 extending downwardly from the upper surface 26 and being of a size to receive a coil retainer spring 33, the ends of which are connected together to provide a continuous ring so that all of the weights normally are retracted into engagement with the hub 21.

In the construction just described, when the weights move outwardly by centrifugal action, each of such weights slides along one of the ribs 24 and such engaged ribs function as drive members which cause the weights to rotate at the speed of rotation of the drive shaft 14, as shown in phantom lines in FIG. 3. Instead of providing generally radially disposed ribs and wedge shaped weights, it is contemplated that the weights could have generally parallel side walls and each weight is slidably received between a pair of generally parallel non-radial ribs. With this construction, the weights will be confined by the ribs as they move radially outwardly under centrifugal action.

With particular reference to FIGS. 2 and 4, a housing 36 is positioned about the lower portion of the drive shaft 14 and such housing includes a cylindrical body 37 having an axial bore 38 in which a bearing or bushing 39 is received. Such bushing engages the drive shaft 14 and permits the housing to rotate freely thereon. A pan or cap 40 is attached to one end of the body 37 and such pan includes a frusto-conical contact 41 having substantially the same taper as the contact surfaces 31 of the weights and being complementary therewith. The outer portion of the pan 40 defines a brake shoe 42 which may be moved into frictional engagement with a brake band or pad 43 which is fixed to the deck 12 in any conventional manner. With reference to FIGS. 2 and 4, the brake shoe 42 is illustrated as a flat outwardly extending flange which engages a flat brake band 43. In FIG. 5, the brake shoe 42 is shown as a continuation of the frusto-conical contact surface 41 and the brake band 43 is shown as a ring having a contact surface 44 which frictionally engages the contact surface 41 and prevents rotation of the housing 36.

The lower end of the body 37 is provided with an outwardly extending ring or flange 45 on which one or more cutter blade, saw blade, or other rotating element 46 is removably mounted by fasteners 47 or the like. A counterbore 48 extends axially inwardly from the lower end of the body 37 and is generally concentric with the bore 38. In order to urge the housing 36 upwardly so that the brake shoe 42 engages the brake band 43 when desired, a shoulder bolt 49 is threadedly mounted in the lower end of the drive shaft 14 and has a stem 50 which extends through the counterbore 48. A spring retaining collar 51 having a bushing 52 is rotatably mounted on the stem 50 and is held in position by the head of the bolt 49. A coiled brake spring 53 is located within the counterbore 48 between the body 37 and the collar 51 so as to exert an upward force on the housing 36 at all times.

Preferably, the housing 36 and the retainer 18 are constructed of ferrous metal such as steel or sintered ferrous metal. However, it is contemplated that the housing, retainer and/or weights could be molded of a thermoplastic material such as nylon, high density polyethylene or the like. Also, either or both of the mating brake surfaces could be metal, thermoplastic material, asbestos or the like.

INDUSTRIAL APPLICABILITY

In the operation of the device, when the power plant is operating at idling speed, as for example approximately 1750 revolutions per minute, the retainer spring 33 has sufficient tension to retract the weights 25 into the retainer 18 and the brake spring 53 urges the housing 36 upwardly so that the brake shoe 42 is in intimate engagement with the brake band 43. In this position the drive shaft 14 and the shoulder bolt 49 which is attached thereto rotate freely within the bushings 39 and 52 respectively, while the housing is held in fixed position. When the speed of rotation of the power plant is increased to the operating range, for example to approximately 2000 revolutions per minute, centrifugal force acting on the weights 25 causes such weights to slide outwardly against the tension of the retainer spring 33. Since the retainer 18 is being driven at all times by the drive shaft, each of the weights 25 slides outwardly along the ribs 24 which is driving the same so that the contact surfaces 31 of the weights engage the contact surface 41 of the housing 36.

Initial contact between the surfaces 31 and 41 causes the housing 36 to move downwardly against the tension of the brake spring 53 and disengages the brake shoe 42 from the brake band 43. After the brake shoe and brake band are disengaged, frictional contact between the contact surface 31 and 41 causes the housing 36 to be rotated substantially at the speed of rotation of the drive shaft 14. If the cutter blade or other rotating element 46 strikes a solid object such as a rock or the like, relative sliding movement may occur between the contact surfaces 31 and 41 to reduce or prevent damage to either the rotating element or the drive connection. Also, if the cutter blades of a lawnmower should encounter a clump of thick or tall grass which normally would stall an internal combustion power plant, the power plant of the present invention will slow down and immediately the return spring 33 will retract the weights 25 and disengage the contact surfaces 31 and 41. When this occurs, the brake spring 53 urges the housing upwardly so that the brake shoe 42 engages the brake band and interrupts rotation of the housing. Since the power plant is thus relieved of its load, it is free to regain its operating speed at which time it will again operate the cutter blade.

When the speed of rotation of the power plant 11 is intentionally reduced, such as for emptying a grass catcher bag or the like, rotation of the cutter blade is interrupted so that such cutter blade does not present a hazzard to the operator if he should inadvertently insert his hand or foot under the deck 12.

We claim:

1. A centrifugal clutch and brake apparatus for selectively connecting a rotatable driven element to a power plant having a drive shaft and which is mounted on a support comprising engaging means carried by the drive shaft of the power plant, return means urging said engaging means toward the axis of the shaft, said return means retracting said engaging means when the power plant is operated at idling speed and permitting said engaging means to be extended by centrifugal action when the power plant is operated at operating speed, said engaging means having a first frictional surface, a housing mounted for rotational and axial movement on the drive shaft of the power plant, said housing including a portion having a second frictional surface which normally is in spaced relationship with said first frictional surface, said housing having first brake means, second brake means fixed to the power plant support, means normally urging said first brake means into engagement with said second brake means, whereby when the drive shaft of the power plant is rotating at idling speed, said engaging means is retracted and said first and second brake means are in engagement with each other, and when the drive shaft is rotating at operating speed, said engaging means is extended so that said first frictional surface is extended into engagement with said second frictional surface of said housing and moves said first brake means out of engagement with said second brake means and causes said housing to be rotated substantially at the speed of rotation of the drive shaft.

2. A centrifugal clutch and brake apparatus for selectively connecting a power plant, mounted on a support and having a drive shaft, to a rotatable driven element comprising retainer means fixed to the drive shaft of the power plant, a plurality of weights slidably carried by said retainer means, return means connected to said weights and urging said weights toward the axis of said retainer means, said return means retracting said weights when the power plant is operated at idling speed and permitting said weights to be extended by centrifugal action when the power plant is operated at operating speed, each of said weights having a first frictional surface adjacent to the end which is remote from the axis of said retainer means, a housing mounted for rotational and axial movement on the drive shaft of the power plant, said housing including a portion having a second frictional surface which is in spaced relationship with said first frictional surface, said housing having first brake means, second brake means fixed to the power plant support, means normally urging said first brake means into engagement with said second brake means, whereby when the drive shaft of the power plant is rotating at idling speed, said weights are retracted into said retainer means and said first and second brake means are in engagement with each other and when the drive shaft is rotating at operating speed, said weights are extended into engagement with said frictional surface of said housing and move said first brake means out of engagement with said second brake means and cause said housing to be rotated substantially at the speed of rotation of the drive shaft.

3. The invention of claim 2 in which said return means is a substantially continuous spring member, and each of said weights has a recess which receives a portion of said spring member.

4. The invention of claim 2 in which said first and second frictional surfaces are generally complementary to each other.

5. The invention of claim 2 in which said first brake means and said second brake means are generally flat and are disposed generally normal to the axis of said retainer means.

6. The invention of claim 2 in which said first brake means and said second brake means are of frusto-conical configurations.

7. In a rotary lawnmower having a deck, a power plant mounted on the deck, a power plant drive shaft extending through an opening in the deck, and a rotatable cutter blade located below said deck and improvement comprising a centrifugal clutch selectively connecting said drive shaft to said cutter blade, said clutch including retainer means fixed to said drive shaft, said retainer means having a hub connected to spaced outwardly extending flanges, at least one of said flanges including guide means, a plurality of weights carried by said retainer means and slidably engagable with said guide means, each of said weights having a recess, a substantially continuous return spring means disposed within the recesses of said weights and urging said weights toward said hub of said retainer, said return spring means having a predetermined tension which retracts said weights when said drive shaft is rotated at idling speed and permits said weights to be extended by centrifugal action when said drive shaft is rotated at operating speed, each of said weights having a tapered contact surface remote from said hub, a housing having a body mounted for rotational and axial movement on said drive shaft, said housing having a portion fixed to one end of said body and extending outwardly therefrom, said portion having a frusto-conical contact surface which is generally complementary with said contact surfaces of said weights and normally being in spaced relationship therewith, said housing having cutter blade mounting means at the opposite end of said body, brake means including brake shoe means fixed to said housing, brake band means fixed to said deck, and brake spring means normally urging said brake shoe means into intimate engagement with said brake band means, whereby when said drive shaft is rotating at idling speed said weights are retracted by said return spring means and said brake shoe means engages said brake band means and when said drive shaft means is rotating at operating speed, said weights are extended by centrifugal action so that said tapered surfaces of said weights engage said contact surface of said housing and move said brake shoe out of engagement with said brake band and cause said housing to be rotated substantially at the speed of rotation of said drive shaft.

* * * * *